(12) United States Patent
Kirkland et al.

(10) Patent No.: US 7,899,514 B1
(45) Date of Patent: Mar. 1, 2011

(54) MEDICAL IMAGE PROCESSING METHODOLOGY FOR DETECTION AND DISCRIMINATION OF OBJECTS IN TISSUE

(75) Inventors: James H. Kirkland, Grant, AL (US); Kevin D. Nash, Madison, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1375 days.

(21) Appl. No.: 11/340,375

(22) Filed: Jan. 26, 2006

(51) Int. Cl.
*A61B 5/05* (2006.01)

(52) U.S. Cl. ......... 600/407; 382/225; 382/128; 382/171; 382/133

(58) Field of Classification Search .................. 600/407, 600/409, 410, 437, 415; 282/128; 702/19–21
See application file for complete search history.

(56) References Cited

U.S. PATENT DOCUMENTS

| | | | |
|---|---|---|---|
| 5,452,367 A | 9/1995 | Bick et al. | |
| 5,832,103 A | 11/1998 | Giger et al. | |
| 5,857,030 A | 1/1999 | Gaborski et al. | |
| 5,999,639 A | 12/1999 | Rogers et al. | |
| 6,282,305 B1 | 8/2001 | Huo et al. | |
| 6,650,766 B1* | 11/2003 | Rogers et al. | 382/132 |
| 6,738,500 B2 | 5/2004 | Bankman et al. | |
| 6,748,044 B2 | 6/2004 | Sabol et al. | |
| 6,785,662 B1 | 8/2004 | Guy et al. | |
| 2002/0064788 A1* | 5/2002 | Monforte | 435/6 |
| 2003/0007598 A1* | 1/2003 | Wang et al. | 378/37 |
| 2003/0231790 A1* | 12/2003 | Bottema | 382/128 |
| 2005/0027188 A1 | 2/2005 | Metaxas et al. | |

OTHER PUBLICATIONS

Odusanya, A.A., M.O., Petrovic, D., et al., "A Genetic Algorithm-Based Model for Breast Cancer Prognosis", *IN: Proceedings of the 6th World Multiconference on Systemics, Cybernetics and Informatics (SCI2002)*, 2002, pp. 394-397.
Abstract: Dongcheol Kim, Sehun Rhee, et al., Modeling and Optimization of a GMA Welding Process by Genetic Algorithm and Response Surface Methodology, *Int'l Journal of Production Research*, vol. 40, No. 7, May 1, 2002, http://taylorandfrancis.metapress.com/(2i1xsi55ru1kre45h53xhbb2)/app/home/contribution.asp?referrer=parent&backto=searcharticlesresults, 13,77;.
Abstract: L.P. Khoo and C.H. Chen, "Integration of Response Surface Methodology with Genetic Algorithms," *Int'l Journal of Advanced Manufacturing Technology*, vol. 18, No. 7, Oct. 2001, pp. 483-489, http://www.springerlink.com/(ftfusd55stuvte45zg4wsi55)/app/home/contribution.asp?referrer=parent&backto=searcharticlesresults,24,75;.

* cited by examiner

*Primary Examiner* — Tse Chen
*Assistant Examiner* — Joel F Brutus
(74) *Attorney, Agent, or Firm* — Joan Gilsdorf

(57) ABSTRACT

A method and system for detecting and classifying anomalies in a medical image. During anomaly detection, once the intensity of an image pixel crosses a detection threshold, the pixel is detected and linking inputs are provided to its nearest-neighbor pixels. The linking inputs increase the intensities of the neighbor pixels, which may result in the detection of these nearest-neighbor pixels if their linked intensities are above the threshold. Each detected anomaly is classified by determining a genetic response surface methodology (GRSM) model for the detected anomaly, determining a cancerous GRSM model from a database of cancerous anomalies, and comparing the cancerous GRSM model to the GRSM model for the detected anomaly to classify the detected anomaly as cancerous or non-cancerous.

36 Claims, 15 Drawing Sheets

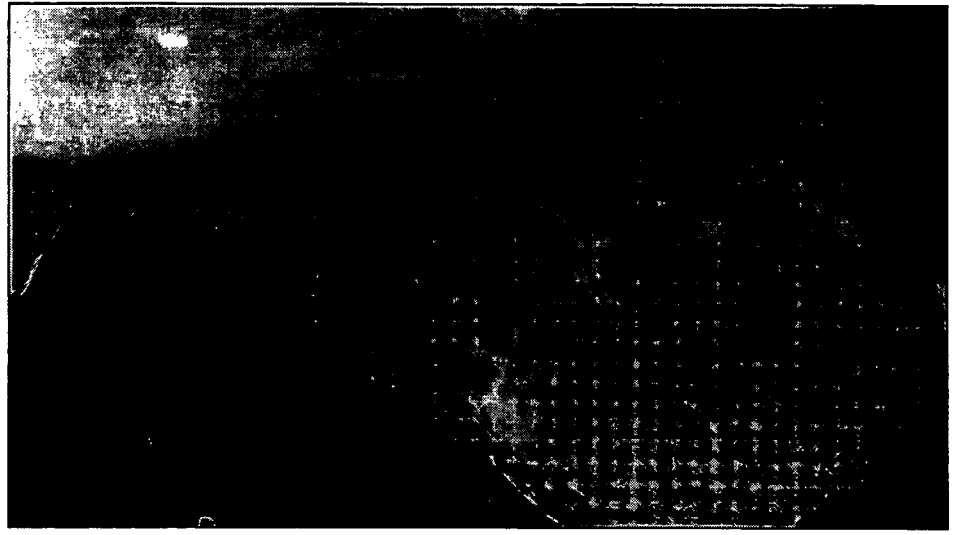
FIG. 5B
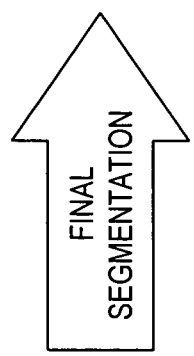
FINAL SEGMENTATION
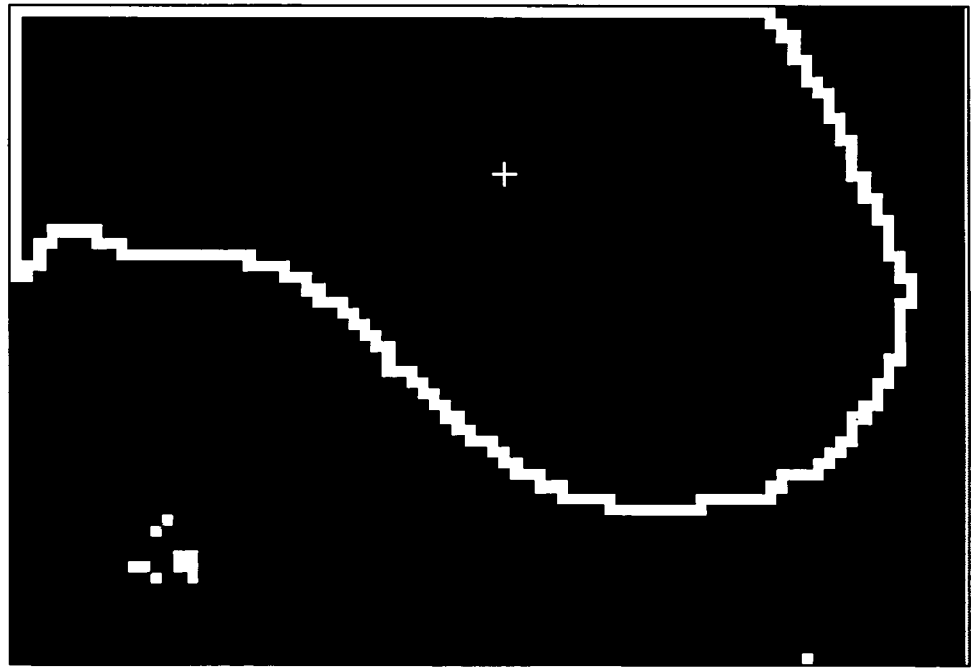
FIG. 5A

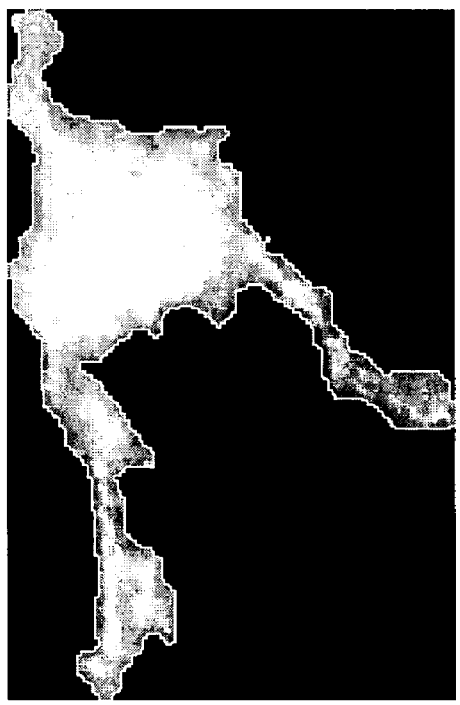
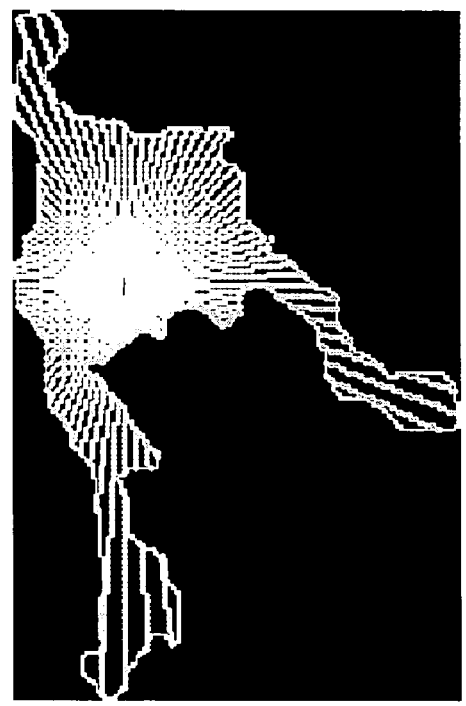
FIG. 8A
FIG. 8B

MEDICAL IMAGE PROCESSING METHODOLOGY FOR DETECTION AND DISCRIMINATION OF OBJECTS IN TISSUE

BACKGROUND

1. Field of the Invention

The present invention is directed, in general, to image analysis and, more particularly, to the computerized detection and discrimination of anomalies in breast tissue images.

2. Description of the Related Art

In the year 2003 in the United States, according to estimates by the National Cancer Institute, there were 211,300 new cases of invasive breast cancer, 55,700 new cases of in situ breast cancers, and 40,200 deaths related to breast cancer. This makes breast cancer the most frequently diagnosed non-skin cancer in women and the second leading cause of cancer-related deaths in women today. There is no reliable estimate, however, of the number of missed cancer detections each year. Early detection of breast cancer greatly increases the probability of survival, and improves quality of life.

In breast cancer, incidence rates have been growing annually at a rate of about 1.1% per year, although mortality rates declined at an annual rate of 1.4% from 1989-1995 and 3.2% subsequently. Approximately 23 million mammograms are performed annually, of which, approximately 10% require additional testing. This leads to about 500,000 needle or surgical biopsies per year at a cost exceeding $1 billion per year to the health care system, with only about 30% of biopsies indicating malignant findings. This underscores the need for improved accuracy of discrimination between cancerous and non-cancerous breast masses to reduce patient trauma and costs.

Another key issue in breast cancer treatment is the number of patients in which the cancer is not completely removed in the initial surgery. Therefore, there is a need for an improved methodology for the radiologist to better define the cancerous margins.

The present invention provides an improved methodology for the radiologist to detect anomalies in the breast tissue, discriminate between cancerous and non-cancerous breast tissue, and to identify the margins of cancerous tissue.

Breast cancer detection is highly dependent on mammogram imagery. The current methodology relies primarily on visual inspection by radiologists with some support from automated computer aided design (CAD) systems. The software for most CAD systems is proprietary and uses intensity thresholding and contrast stretching for detection and shape/pattern recognition for discrimination. The current methodology has the following limitations: (1) poor detection in early stages and in high-density breast tissue; (2) many false alarms; (3) poor discrimination of cancerous masses from calcifications, non-cancerous lesions, and cysts; and (4) an inability to resolve the margins of the cancerous mass.

The present invention overcomes these limitations by providing improved detection of masses in noisy images, improved discrimination capability that reduces the number of false alarms, and improved digital visualization to aid the radiologist in defining cancerous margins.

SUMMARY

Accordingly, it is an aspect of the present invention to provide a method and system for the automated detection and classification of anomalies in medical images of the breast.

Another aspect of the present invention is to provide a method and system for the automated detection and classification of anomalies in medical images of the breast that improves the accuracy of discrimination between cancerous and non-cancerous breast masses to reduce patient trauma and costs.

Another aspect of the present invention is to provide a method and system for the automated detection and classification of anomalies in medical images of the breast that improves the definition of the margins of cancerous masses to aid in better surgical removal of cancerous masses from breast tissue.

These and other aspects are achieved according to the present invention by providing a new and improved methodology for the processing of medical imagery that improves the detection of anomalous masses in dense breast tissue and better characterizes these masses as cancerous or benign. The present invention provides an Anomaly Detection Algorithm (ADA) module, referred to herein as the "ADA module," for detection of anomalies (also referred to herein as "masses") in the breast tissue, and a Genetic Response Surface Methodology (GRSM) algorithm module (referred to herein as the "GRSM module") for classification of detected masses as cancerous or non-cancerous. These two algorithms are integrated into a modular image processing architecture.

In the ADA module, once the intensity of an image pixel crosses a detection threshold, the pixel is detected and linking inputs are provided to its nearest-neighbor pixels, raising their intensities, which may allow the detection of these nearest-neighbor pixels if their raised intensities are greater than the threshold. Each anomaly in the mammogram detected by the ADA module is tracked and passed to the GRSM module for characterization as cancerous or benign. The GRSM module characterizes masses identified by the ADA module as cancerous or benign based on features such as shape, intensity profile, and edge spiculation.

According to an embodiment of the present invention, there is provided a method for discriminating anomalies in a medical image, including detecting anomalies in the medical image, classifying the detected anomalies as cancerous or non-cancerous, and displaying the detected anomalies on the medical image. The anomalies are classified by determining a GRSM model for each of the detected anomalies, determining a cancerous GRSM model from a database of cancerous anomalies, and comparing the cancerous GRSM model to the GRSM model for each of the detected anomalies to classify each of the detected anomalies as cancerous or non-cancerous.

According to another embodiment of the present invention, there is provided a computer-readable storage storing computer instructions for computerized detection and classification of anomalies in a digitized medical image. The computer instructions include segmenting the medical image to identify a region of interest, detecting anomalies in the segmented medical image, classifying the detected anomalies as cancerous or non-cancerous, and displaying the detected anomalies on the medical image. The anomalies are classified by determining a GRSM model for each of the detected anomalies, determining a cancerous GRSM model from a database of cancerous anomalies, and comparing the cancerous GRSM model to the GRSM model for each of the detected anomalies to classify each of the detected anomalies as cancerous or non-cancerous.

According to another embodiment of the present invention, there is provided a system for analyzing a medical image to detect and classify anomalies in the medical image, including a programmable computer and computer software installed on the programmable computer. The computer software enables the programmable computer to detect anomalies in the medical image, determine a GRSM model for each of the detected anomalies, determine a cancerous GRSM model from a database of cancerous anomalies, compare the cancerous GRSM model to the GRSM model for each of the detected anomalies to classify each of the detected anomalies as cancerous or non-cancerous, and display the detected anomalies on the medical image.

According to another embodiment of the present invention, there is provided a system for detecting and classifying anomalies in a medical image, including a detector detecting anomalies in the medical image, a classifier to classify the detected anomalies as cancerous or non-cancerous, and a display to display the detected anomalies on the medical image. The classifier determines a GRSM model for each of the detected anomalies, determines a cancerous GRSM model from a database of cancerous anomalies, and compares the cancerous GRSM model to the GRSM model for each of the detected anomalies to classify each of the detected anomalies as cancerous or non-cancerous.

BRIEF DESCRIPTION OF THE DRAWINGS

The above and other aspects and advantages of the present invention will become apparent and more readily appreciated from the following description, appended claims, and accompanying drawings, of which:

FIGS. 5A and 5B illustrate final segmentation of the image and the version of the image to be processed for detection and classification of anomalies;

FIG. 8A shows an example of a detected anomaly;

FIG. 8B shows radii from the centroid of energy of the detected anomaly of FIG. 8A to the edges of the anomaly;

DESCRIPTION

The present invention provides a method, system, and apparatus for the implementation of image processing and response surface methodology algorithms to process images (e.g., mammogram, magnetic resonance imaging (MRI), and ultrasound imagery) in order to provide improved detection of objects, such as anomalous masses in dense breast tissue, and to better characterize these masses as cancerous or benign. The detection and discrimination of anomalous masses in mammogram images will be described herein for illustrative purposes.

The present invention provides (1) an Anomaly Detection Algorithm (ADA) module for detection of masses in the breast tissue, (2) a Genetic Response Surface Methodology (GRSM) module for classification of detected masses as cancerous or non-cancerous, and (3) a definition of margins of the cancerous masses, using the results of the ADA module, to support surgical procedures. The algorithms are integrated into a modular image processing architecture that can be implemented on a computer-aided design (CAD) system, for example, that is user-friendly to radiologists.

Figure 1:
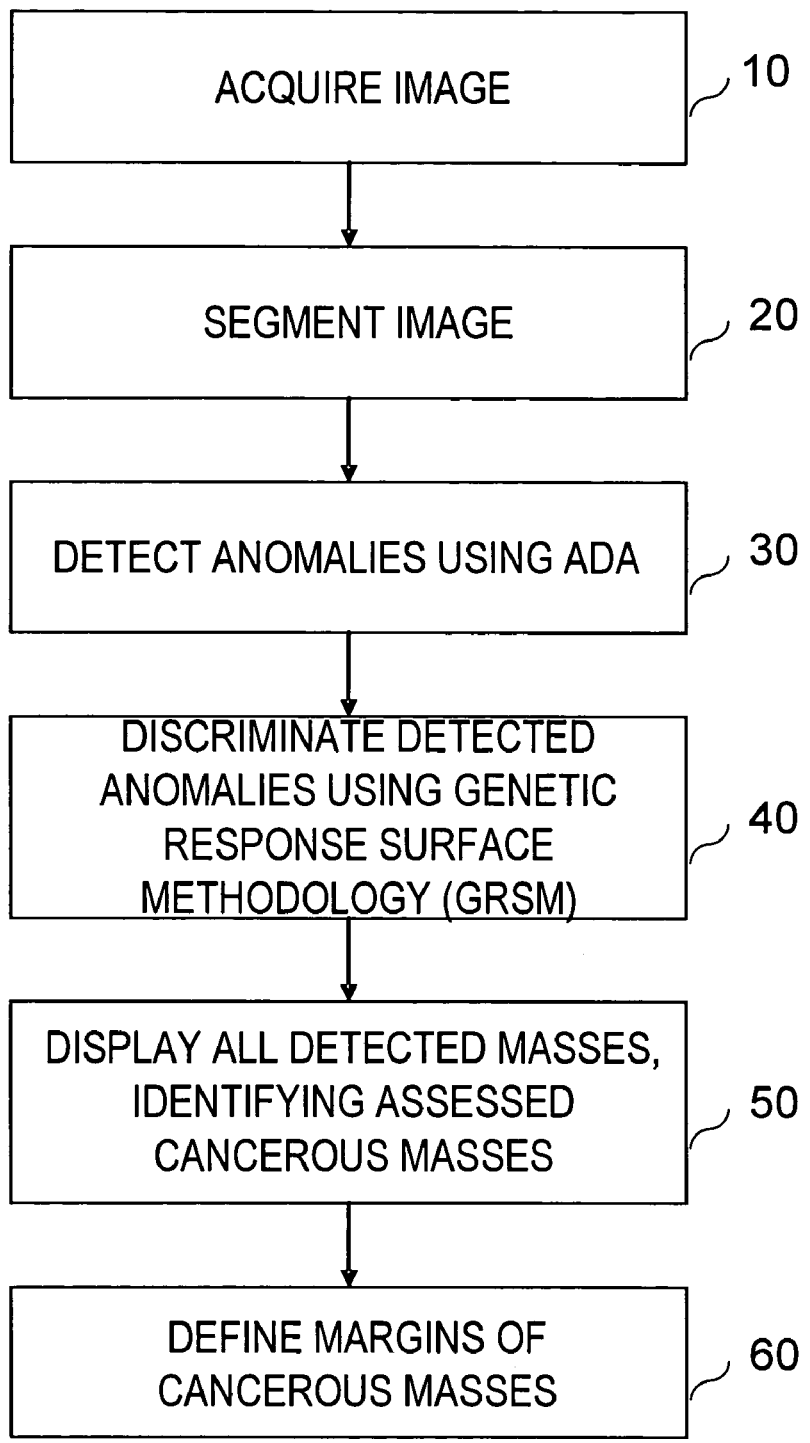
FIG. 1 is a flow diagram illustrating the detection and discrimination of objects in medical images according to an embodiment of the present invention.

The overall architecture of the present invention is shown in FIG. 1. Once a mammogram, ultrasound, or MRI image is acquired at 10, the image is segmented at 20 into breast tissue and background to identify the breast region and eliminate undesired objects from the image, such as labels and patient information. Anomalies are detected in the segmented image using the ADA module at 30. The detected anomalies are classified as cancerous or non-cancerous using the GRSM module at 40. All the detected masses are displayed and the cancerous masses are identified at 50. Lastly, the margins of the cancerous masses are defined at 60.

Figure 2:
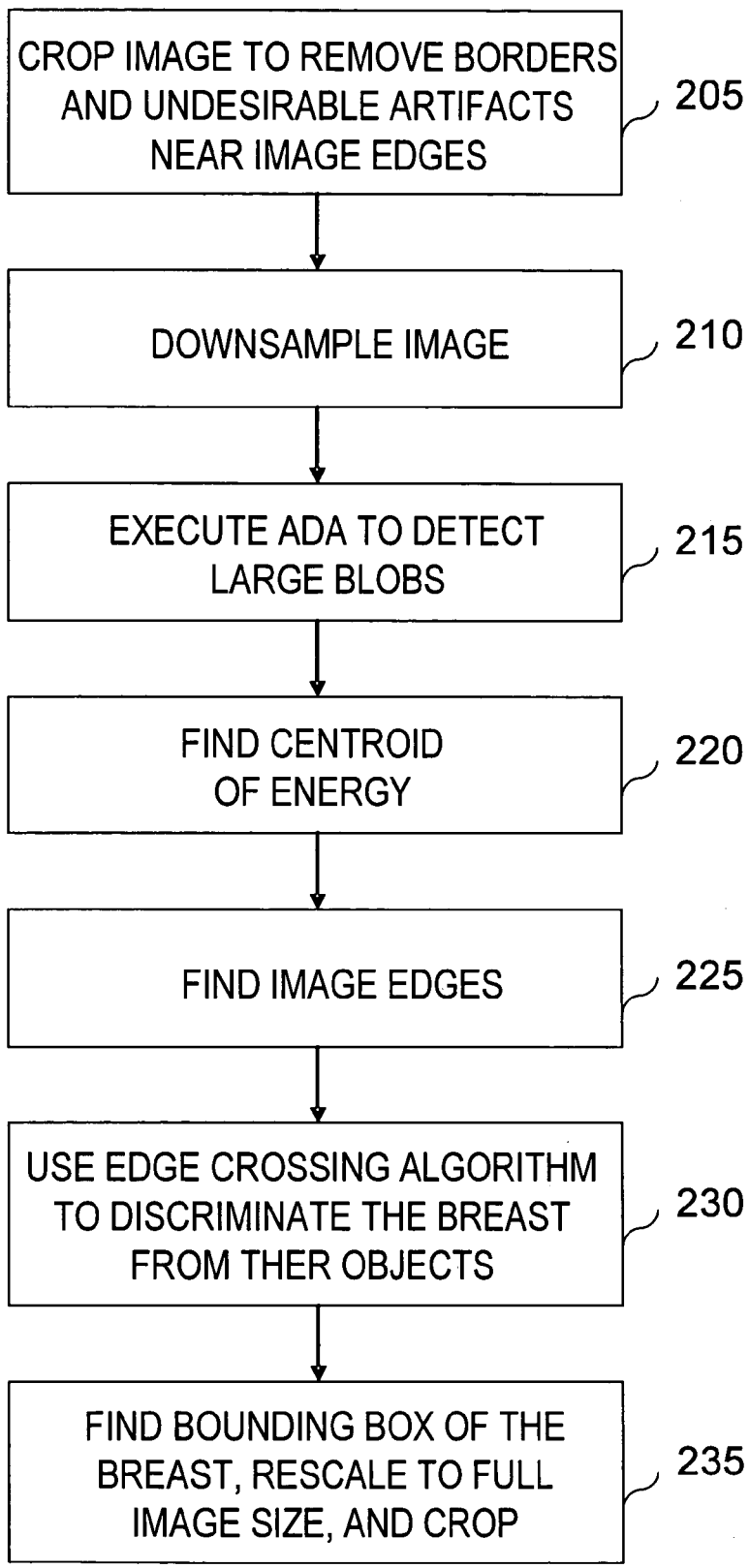
FIG. 2 is a flow diagram of image segmentation.
Figure 3B:
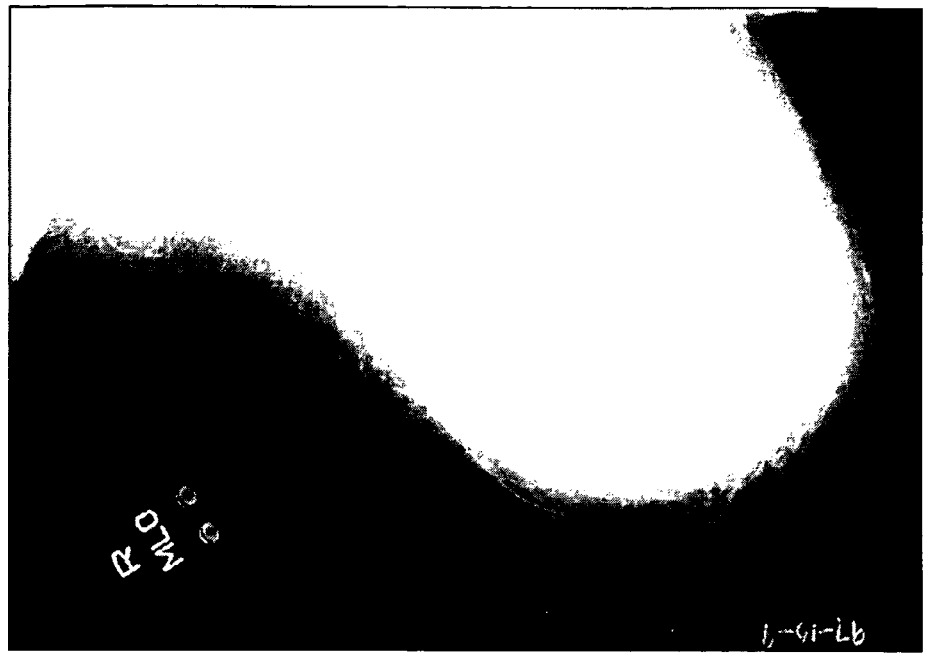
FIGS. 3A and 3B illustrate initial image cropping.
Figure 3A:
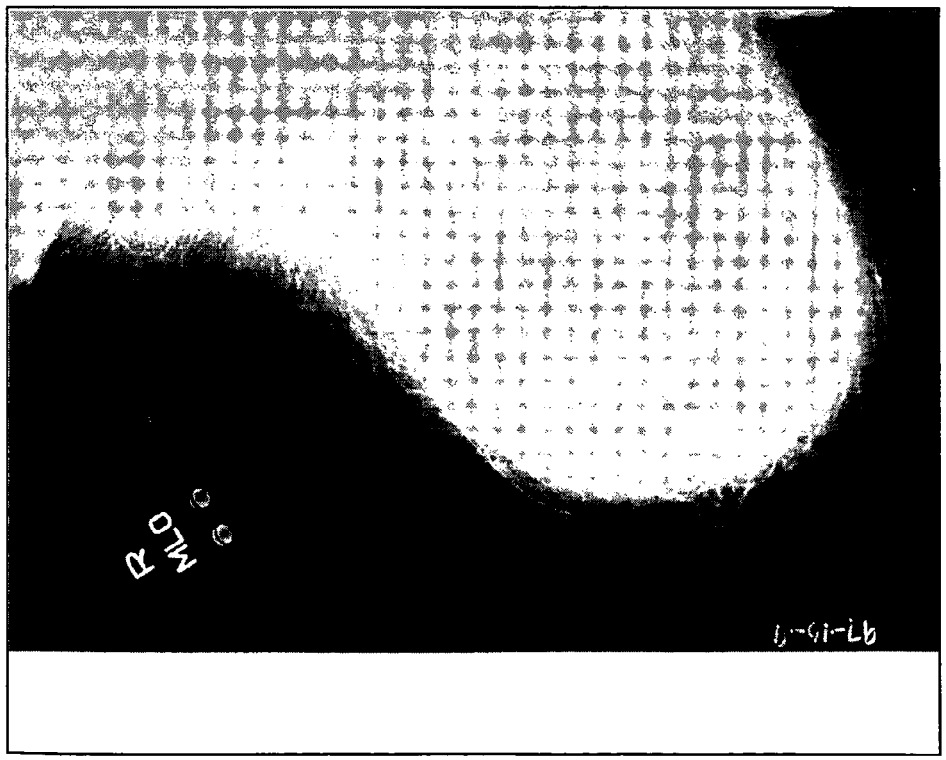

Turning now to a more detailed discussion, the segmentation process 20 is shown in greater detail in FIG. 2. During segmentation, the image is cropped at 205 (see FIGS. 3A and 3B) to remove borders and undesirable artifacts near the image edges, such as the bright borders around the image. The undesirable artifacts/borders are cropped using manual and/or conventional automated processes. The manual process involves using a digital image editor to select large areas of interest, whereas the automated process uses changes in intensity to determine when to initiate and terminate cropping.

The cropped image is downsampled at 210 (FIG. 2) to decrease the processing time of the ADA module. The image is downsampled by a factor of 100, for example, using a common decimation algorithm, which takes each successive 10-pixel by 10-pixel block of pixels and outputs a single pixel whose intensity is equal to the mean intensity of the 10×10 block. The image may be downsampled to other resolutions, as desired.

The ADA module is executed at 215 to detect and isolate large objects within the image, such as the breast. The ADA module is a detection and association algorithm that detects pixels having an intensity above a threshold intensity, and associates these pixels with adjacent pixels that have intensities above a linking threshold intensity into the objects referred to as "anomalies." The ADA module is described in greater detail below.

Figure 4B:
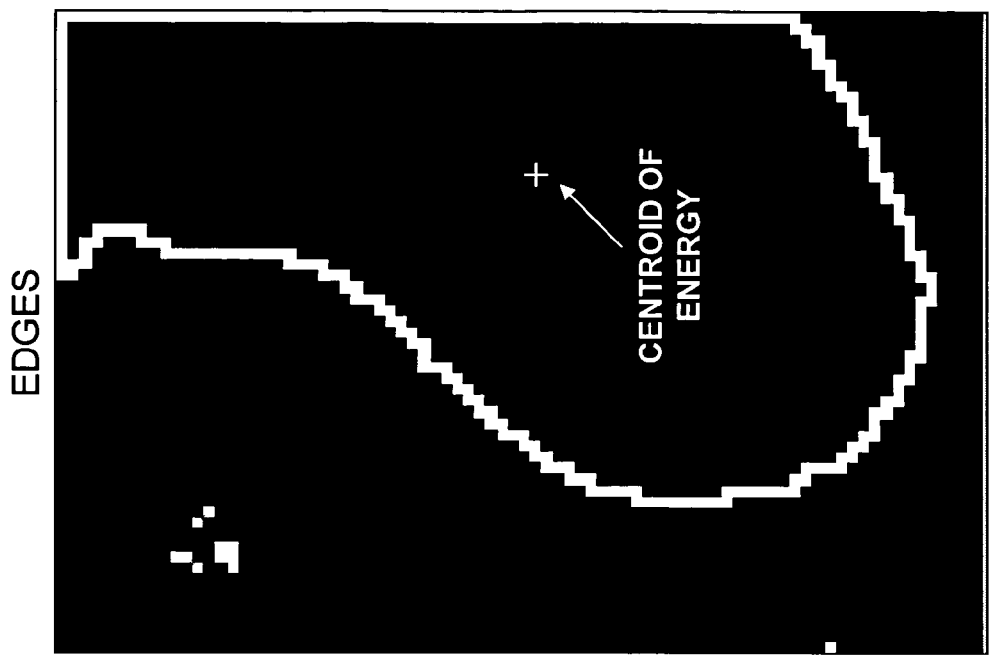
FIGS. 4A and 4B illustrate edge detection.

After the large objects have been detected, the centroid of energy of the image is calculated at 220. See FIG. 4B for an illustration of the centroid of energy. The centroid of energy is calculated, using the intensities of the pixels detected at 215 (FIG. 2) with the ADA module, in both the x and y dimensions of the image.

Figure 4A:
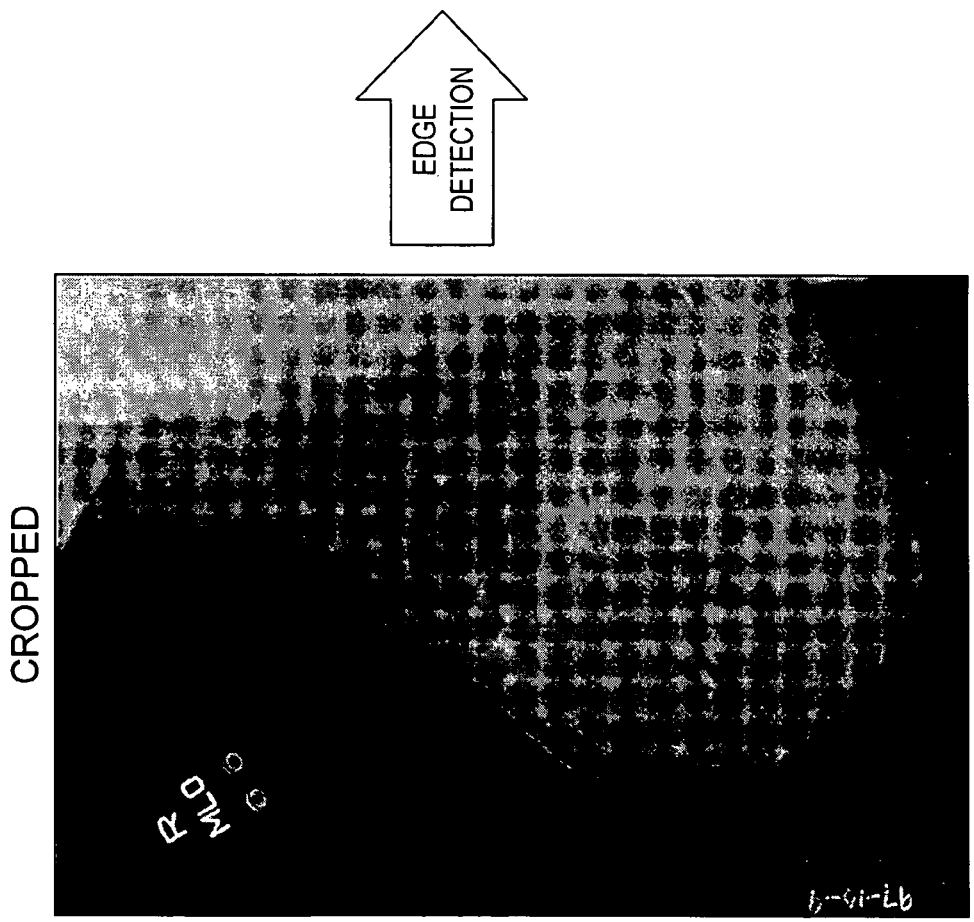

An edge detection algorithm detects the edges of the objects in the image at 225. See FIGS. 4A and 4B for an illustration of edge detection. "Edge pixels" are pixels with at least one nearest-neighbor pixel that was not detected with the ADA module at 215 (FIG. 2). The edge detection algorithm searches through a list of detected pixels created by the ADA module. If one of the detected pixels has at least one nearest neighbor that was not detected by the ADA module, then this detected pixel is added to an edge pixel list.

The breast edge pixels are discriminated from the edge pixels of other objects using an edge-crossing algorithm at 230. Because the breast region occupies the largest region on the image, the centroid of energy calculated at 220 should be on the breast region. The edge-crossing algorithm operates by proceeding along a line from all edge pixels to the centroid of energy. If another edge is crossed, then the edge pixel from which a line originates does not belong to the breast and is removed from the list of edge pixels.

After the breast has been discriminated from other objects in the image, the image is cropped again at 235 by defining a bounding box of the breast using its edge pixels as identified at 230. Also at 235, the bounding box is rescaled to full size by multiplying by the downsampling factor, and the sub-image defined by this bounding box, which only includes anomalies that are in the breast, is returned for further processing. See FIGS. 5A and 5B for an illustration of final segmentation.

Referring back to FIG. 1, after segmentation at 20, the ADA module is executed again at 30 on the cropped, full-resolution image of the breast to identify individual anomalies in the breast tissue. Execution of the ADA module at 30 differs from execution of the ADA module during segmentation at 20 by using, for example, different thresholds and linking coefficients (described below).

Figure 6:
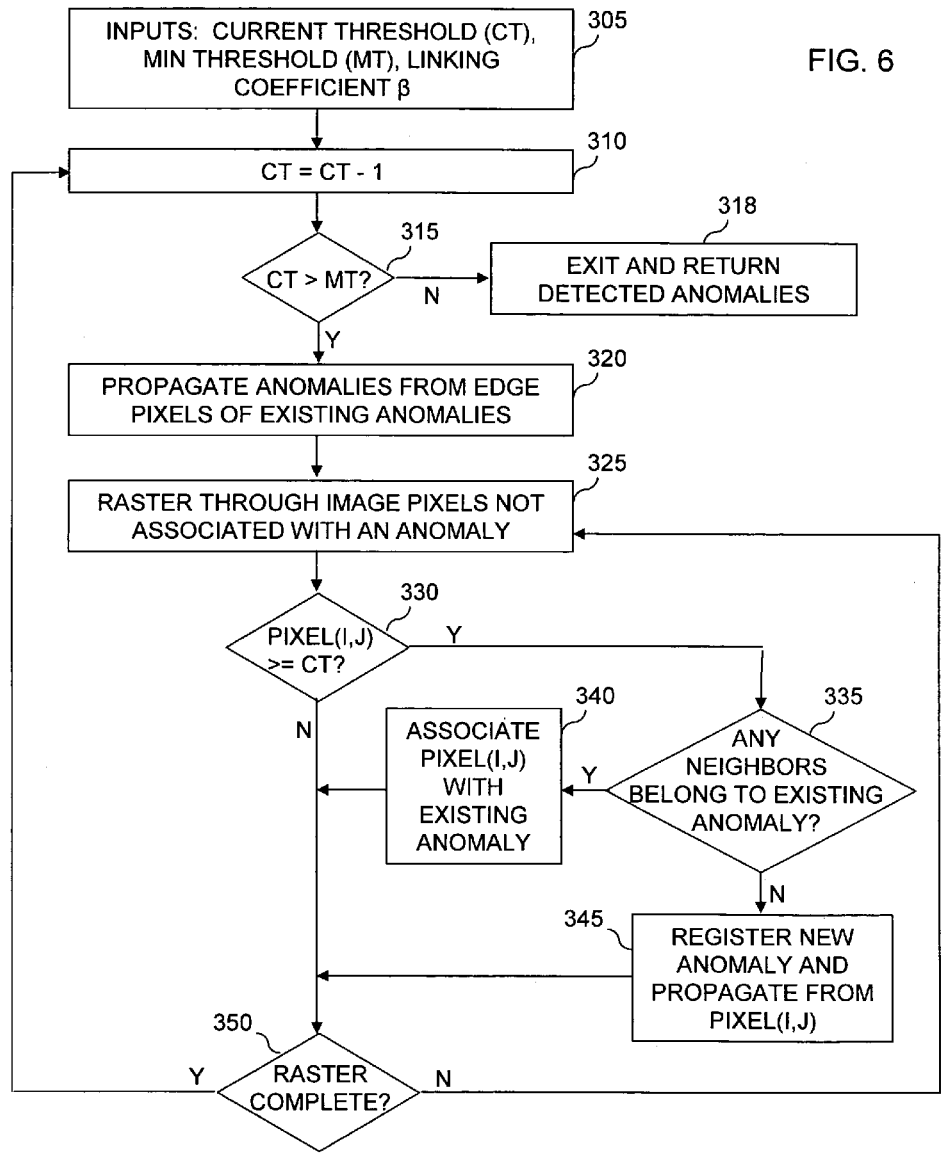
FIG. 6 is a flow diagram of anomaly detection.

The ADA module process will now be described in greater detail by referring to FIG. 6. In FIG. 6, a current threshold, a minimum threshold, and a linking coefficient $\beta$ are input to the ADA module at 305. The current threshold is initially set to the maximum pixel intensity in the entire image plus one. The minimum threshold is set to the mean intensity of all the pixels in the entire image. The linking coefficient $\beta$ may be either selected by the user or calculated. The linking coefficient $\beta$ may be calculated, for example, by (a) calculating the histogram of the intensity data for the breast and finding the maximum intensity value, (b) calculating the slopes of the histogram in each direction away from the maximum intensity value and choosing the minimum slope, and (c) calculating the pixel linking coefficient $\beta$ using this minimum slope.

After inputting the current threshold, the minimum threshold, and the linking coefficient, initiate a search for anomalies at 310. Determine whether the current threshold is greater than the minimum threshold at 315. If not, exit the ADA module and return the detected anomalies at 318. Otherwise, in each iteration, attempt to propagate detected (i.e., existing) anomalies from their edge pixels at 320 by checking the linked intensities of the nearest neighbors of the edge pixels of the existing anomalies.

Propagation of anomalies at 320 is accomplished by linking detected edge pixels of an existing anomaly to their nearest neighbors (e.g., linking to the eight pixels surrounding a detected edge pixel), and determining if these neighbors have linked intensities high enough to be detected for further propagation. The linked intensity $I_L$ of a particular nearest neighbor pixel is given by the following equation:

$$I_L = (1 + \beta * I) * I_N$$

In the above equation, $\beta$ is the linking coefficient, I is the intensity of the detected edge pixel (i.e., the pixel from which propagation of anomalies is attempted), and $I_N$ is the initial intensity of the nearest neighbor pixel. If the linked intensity $I_L$ is above the current threshold, the nearest-neighbor pixel is detected and associated with the existing anomaly.

After propagating the existing anomalies at 320, raster over the image pixels that are not associated with an anomaly at 325. Determine whether any of these pixels is detected at 330. In other words, determine at 330 whether a pixel that has not been associated with an existing anomaly has an intensity that is greater than or equal to the current threshold value. If such a pixel is detected, attempt to associate it with an existing anomaly at 335 by checking its nearest neighbors. If any of the nearest-neighbor pixels is associated with an existing anomaly, the detected pixel is also associated with that anomaly at 340. If two or more neighbor pixels are found to be associated with different existing anomalies, then the detected pixel is associated with, for example, the existing anomaly that was first detected. If none of the nearest-neighbor pixels is associated with an existing anomaly, a new anomaly is registered at 345 and the new anomaly is propagated from the newly detected pixel. The new anomaly is propagated by checking the newly detected pixel's nearest neighbors to determine if their linked intensities are greater than the current threshold. If so, these nearest neighbors are associated with the new anomaly and their nearest neighbors are checked to determine if their linked intensities are greater than the current threshold.

Next, determine whether the raster is complete at 350. If not, continue to raster to the end of the image, associating new detections and propagating new anomalies as they occur. After completing the raster, set a new current threshold at 310, and continue looping until the current threshold becomes less than or equal to the minimum threshold at 315.

Referring back to FIG. 1, after the anomalies have been detected using the ADA module at 30, the anomalies are passed to the discrimination operation at 40 to determine whether the anomalies are cancerous or non-cancerous.

Figure 7:
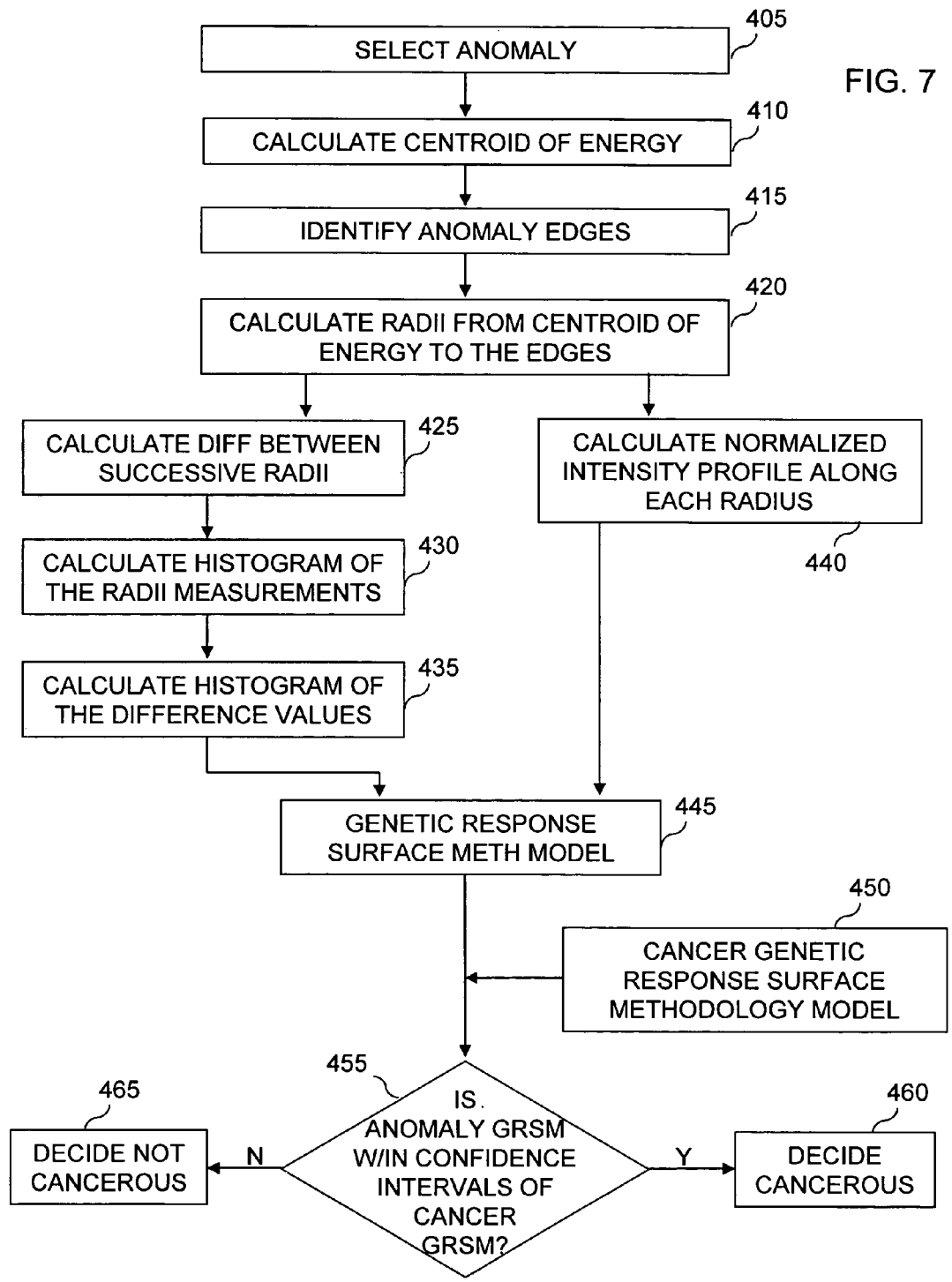
FIG. 7 is a flow diagram of anomaly discrimination.

Anomaly discrimination is illustrated in FIG. 7. For each anomaly, the following operations are performed.

(1) First, select one of the anomalies at 405 and determine data related to shape, intensity profile, and edge spiculation. An example of an anomaly is shown in FIG. 8A.

(2) Calculate the centroid of energy of the selected anomaly at 410.

(3) Define the anomaly edges at 415 using the edge detection algorithm described above.

Figure 8D:
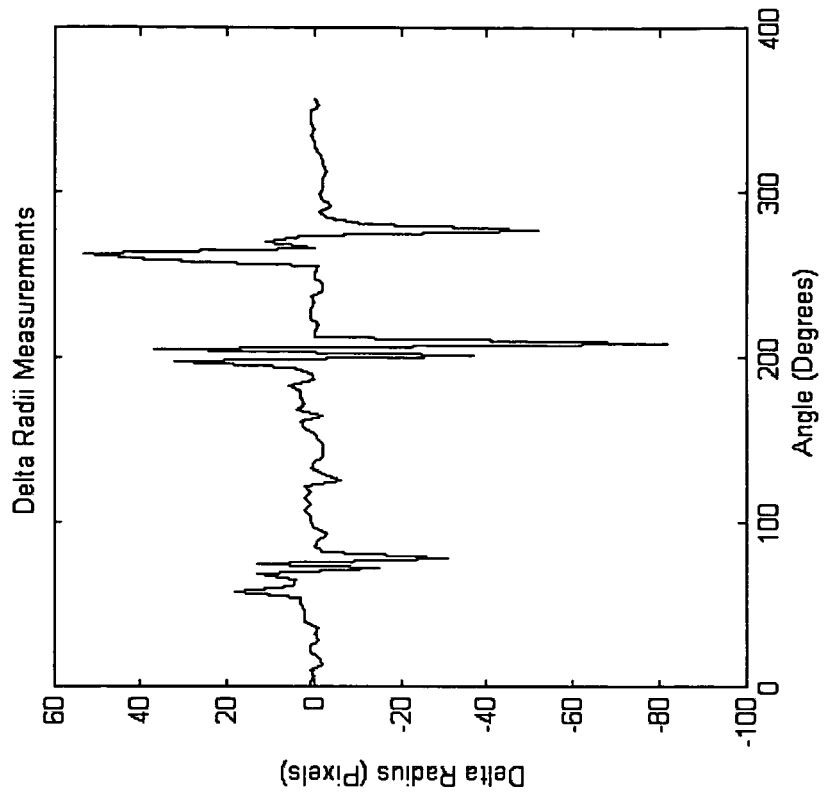
FIG. 8D is a graph of delta radii measurements for the detected anomaly of FIG. 8A.
Figure 8C:
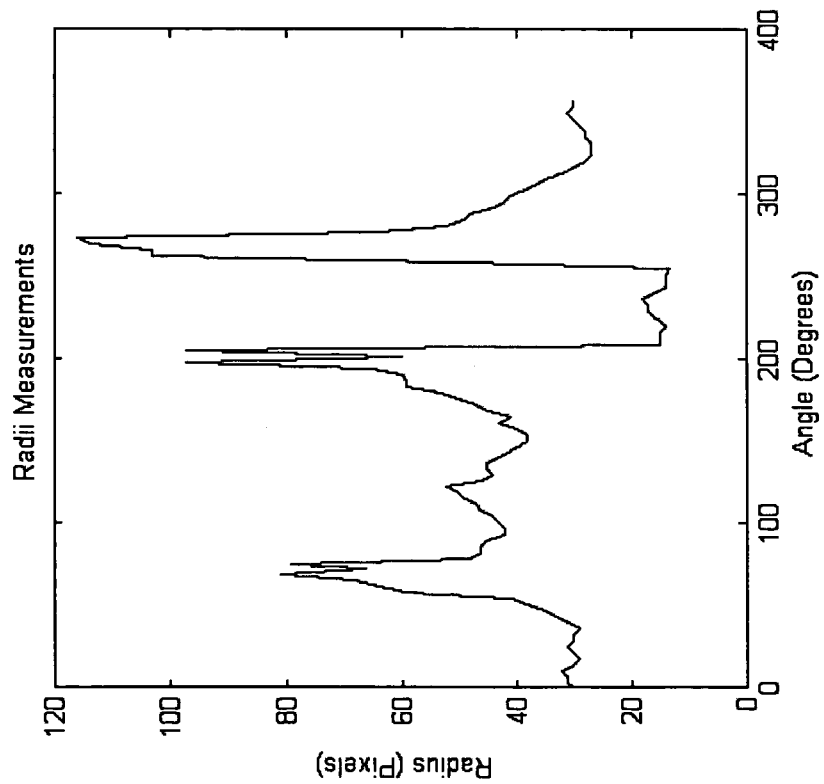
FIG. 8C is a graph of radii measurements for the detected anomaly of FIG. 8A.

(4) Calculate the radii (in pixels) from the centroid of energy to the anomaly edges at 420 as a function of angle, for example, in one-degree angular increments. FIG. 8B shows the radii from the centroid of energy of the anomaly shown in FIG. 8A to the edges of the anomaly, and FIG. 8C shows the radii measurements as a function of angle.

(5) Calculate the differences in successive radii at 425 (FIG. 7). The delta radii measurements for the anomaly of FIG. 8A are shown in FIG. 8D.

Figure 8F:
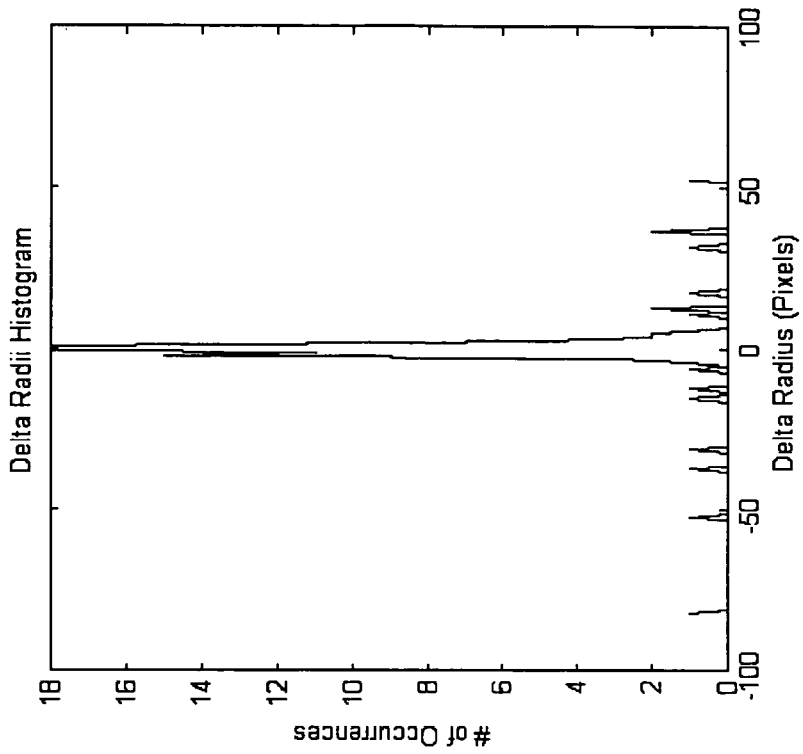
FIG. 8F is a histogram of the differences in successive radii for the delta radii measurements of FIG. 8D.
Figure 8E:
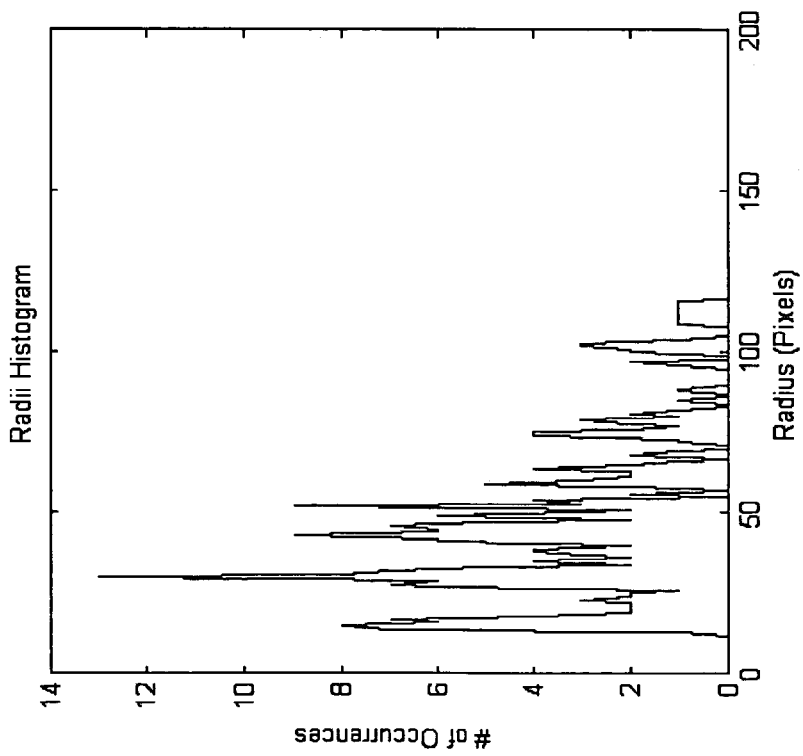
FIG. 8E is a histogram of the radii measurements of FIG. 8C.

(6) Calculate the histogram of the radii at 430 (FIG. 7) and the histogram of the differences in successive radii at 435. The radii histogram and the delta radii histogram for the anomaly of FIG. 8A are shown in FIGS. 8E and 8F, respectively.

Figure 9:
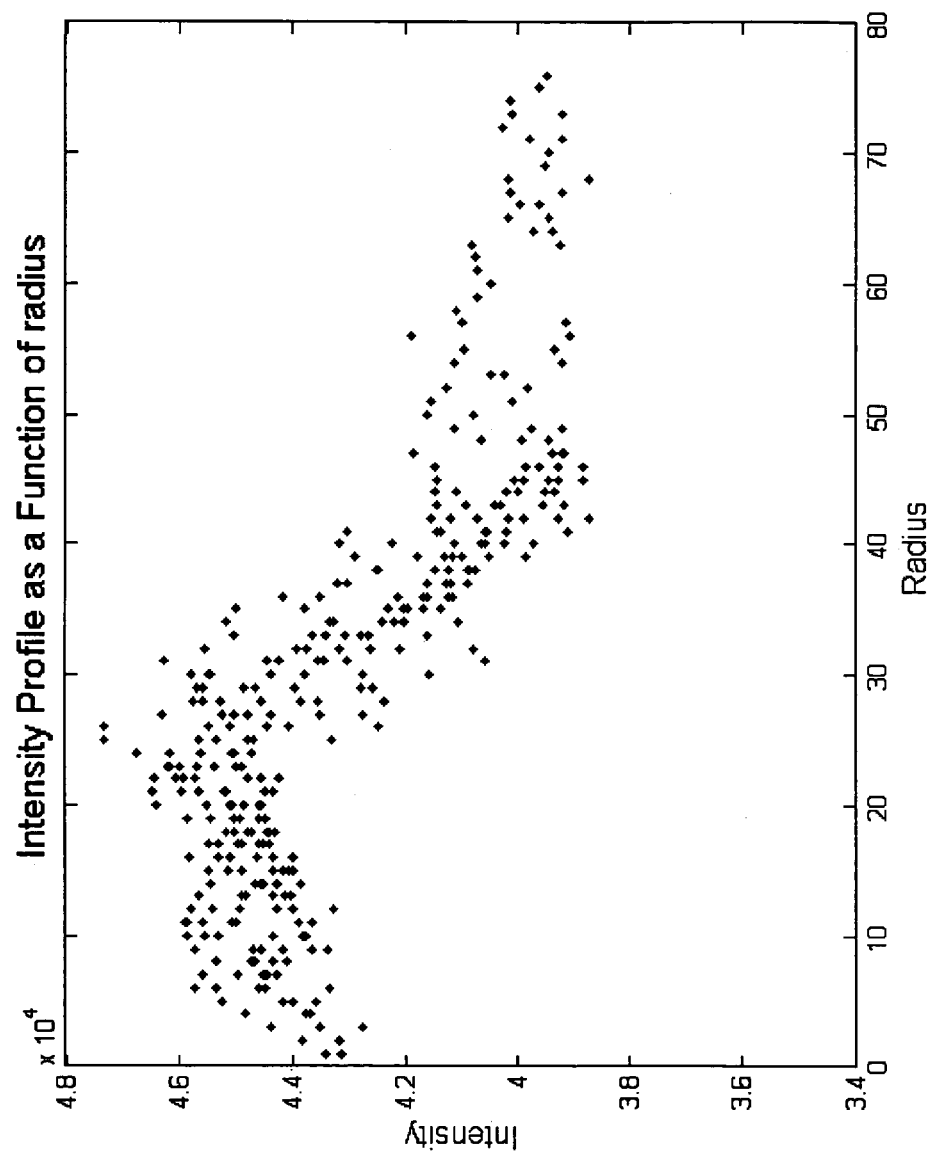
FIG. 9 is a graph of intensity profile as a function of radius for the detected anomaly of FIG. 8A.

(7) Normalize the intensity profile along each radius at 440 by, for example, dividing each radius by the longest radius. See FIG. 9.

(8) Provide the resulting input data (i.e., the histogram of the radii, the histogram of the differences in radii, and the intensity profile) from the above calculations to the GRSM module at 445 (FIG. 7), from which a GRSM model is determined for the anomaly under test. Determination of a GRSM model is described in more detail below.

(9) Determine a GRSM model for cancerous anomalies (referred to as the "cancerous GRSM model") at 450 using a database of known cancerous breast masses.

(10) Compare the cancerous GRSM model at 455 to the GRSM model for the anomaly under test to determine whether the anomaly under test is cancerous. If the GRSM model for the anomaly under test is within predefined confidence intervals of the cancerous GRSM model, then the anomaly under test is determined to be cancerous at 460. Otherwise, the anomaly under test is determined to be non-cancerous at 465.

The GRSM module integrates response surface methodology with genetic algorithms. Response surface methodology is a mathematical technique that predicts the response of a system or process that is dependent upon several input variables. The inclusion of a genetic algorithm provides near optimal linear combination of the input variables and, thus, optimization of the response. The GRSM module of the present invention optimizes the classification of the detected anomalies as cancerous or non-cancerous.

Figure 10:
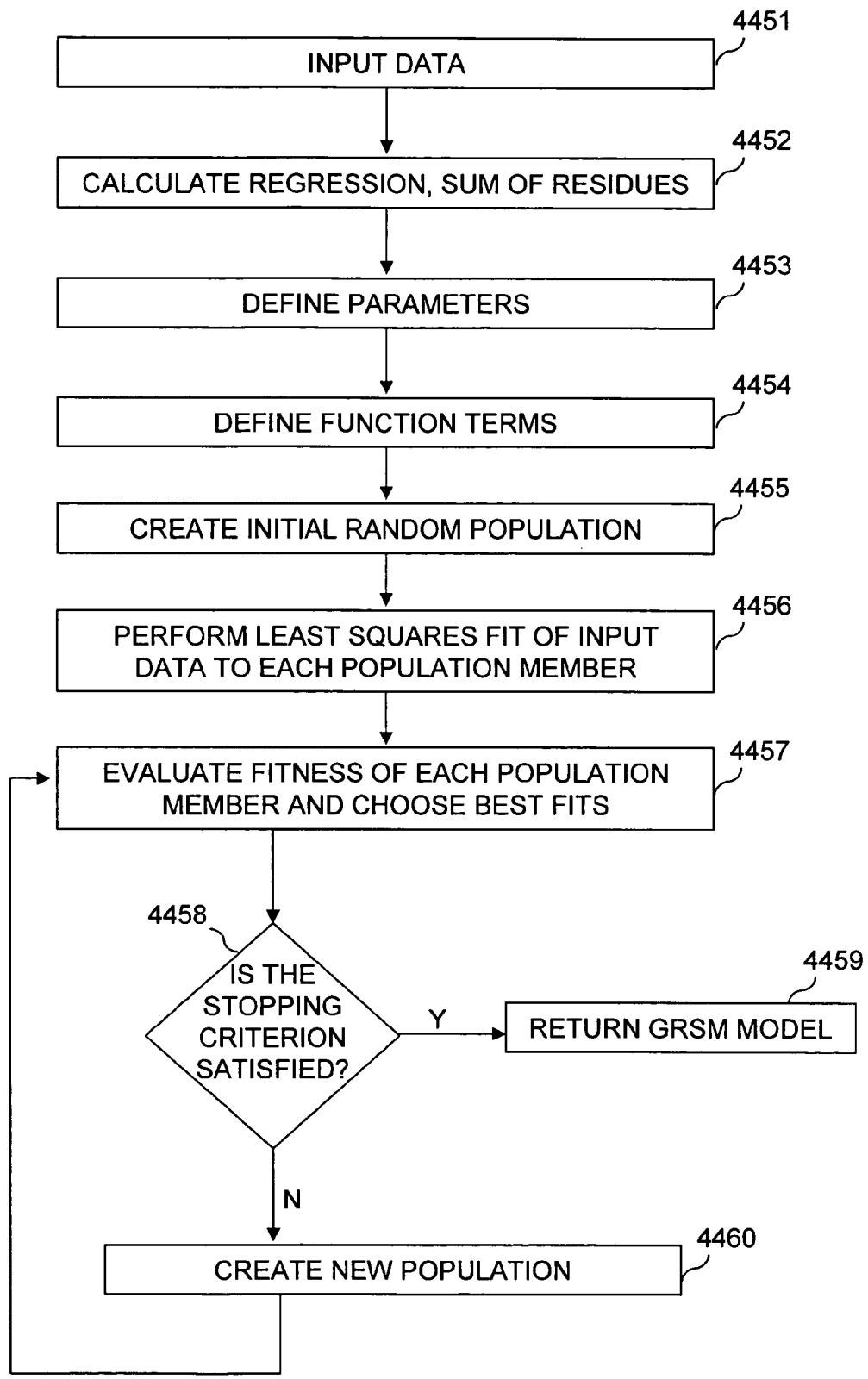
FIG. 10 is a flow diagram of the Genetic Response Surface Methodology (GRSM) module.

Referring to FIG. 10, the following operations are performed to determine a GRSM model.

(1) Enter the input data at 4451.

(2) At 4452, calculate a regression for the intensity profile of the anomaly using the normalized profiles for all radii, and calculate the sum of the residues.

(3) Define a list of parameters at 4453 to which the response of the model may be sensitive. The parameters characterize the input data and may include, for example, the slopes of the histograms. Other parameters related to patient clinical data and lifestyle factors are possible depending upon the particular circumstances. The parameters used by the GRSM module are optimized using a genetic algorithm to maximize the true-positive detections while minimizing the false-positive detections. For purposes of illustration, parameters $x_1, x_2, x_3, x_4, x_5, x_6$, and $x_7$ will be used in the examples that follow to determine an nth-order GRSM algorithm or GRSM model $f(x_1, x_2, x_3, x_4, x_5, x_6, x_7)$ that best satisfies a user-defined fitness function $G(x_1, x_2, x_3, x_4, x_5, x_6, x_7)$.

The fitness function is an expression of the goals of the problem to be solved and the problem-specific parameters. The goals influence the weightings applied to the terms of the fitness function. In the present invention, the goal of the fitness function is to optimize the fit of the response surface model to the input data. The specifics, such as the coefficients of the fitness function, will change depending upon the particular circumstances of each problem. The concept of use of fitness functions with generic algorithms is known. Thus, one of skill in the art would understand how to formulate the appropriate fitness function for a given application.

(4) Define a pool of function terms at 4454 using the above parameters. The highest order M is chosen. The GRSM module genetically evolves the population of equations presented below to find a best fit to the fitness function G. The fitness function can be tailored to favor lower-order equations over higher-order ones. If M=3, the pool of function terms (i.e., chromosomes) becomes the following:

$$x_1, x_1^2, x_1^3, x_1^{-1}, x_1^{-2}, x_1^{-3}, x_2, x_2^2, x_2^3, x_2^{-1}, x_2^{-2}, x_2^{-3}, x_3,$$
$$x_3^2, x_3^3, x_3^{-1}, x_3^{-2}, x_3^{-3}, x_4, x_4^2, x_4^3, x_4^{-1}, x_4^{-2}, x_4^{-3},$$
$$x_5, x_5^2, x_5^3, x_5^{-1}, x_5^{-2}, x_5^{-3}, x_6, x_6^2, x_6^3, x_6^{-1}, x_6^{-2},$$
$$x_6^{-3}, x_7, x_7^2, x_7^3, x_7^{-1}, x_7^{-2}, \text{ and } x_7^{-3}$$

(5) Create an initial population of equations at 4455 by defining a large sample of equations (e.g., 100 equations) of random order, which are assembled using random combinations of the function terms. Each equation is a candidate GRSM model of the anomaly under test. For M=3 and the parameters $x_1, x_2, x_3, x_4, x_5, x_6$, and $x_7$, the initial generation of equations becomes the following:

$$f_1 = a_{1,1} + a_{1,2}x_4^{-3}x_2^3x_6^{-1} + a_{1,3}x_3^{-3} + a_{1,4}x_1^{-2}x_7^3x_6^3x_5^{-2} + a_{1,5}x_4^3x_5^2$$

$$f_2 = a_{2,1} + a_{2,2}x_1^3x_2^3x_2^{-2} + a_{2,3}x_4^{-1}x_1^{-3}x_6^{-2}x_7^{-2} + a_{2,4}x_4^{-2}x_6^3x_1^{-2}x_7^{-2} + a_{2,5}x_6^{-2}x_6^3x_5^3$$

$$f_n = a_{n,1} + a_{n,2}x_2^2x_2^{-1} + a_{n,3}x_7x_6^3x_2^{-3}x_5^{-2} + a_{n,4}x_5^3x_6^{-2}x_6^{-2}x_2^{-2}x_4^{-2}$$

In the above equations, $a_{i,j}$ represents the coefficient for term j of equation i.

(6) Perform a standard least squares fit of the input data to each equation at 4456 to determine the equation coefficients for each function term.

(7) Score each resulting equation against the input data using the fitness function G at 4457, and rank the equations based on their fit to the fitness function G.

(8) Determine whether a user-defined constraint (i.e., termination criterion), as described below, has been satisfied at 4458.

(9) If the termination criterion has not been met, then create a new population of equations at 4460 by producing children of the best fit equations. The children are produced by randomly exchanging function terms between the best fit equations, similar to the way in which chromosomes from parents are exchanged in the DNA of children.

For example, a weighted random draw from the initial population based on rank can be performed to choose K+1 parents (K being an even number). A certain percentage, for example, 20% of the initial population, may be chosen. K of the parents are then divided into pairs. Each pair's function terms are used to form a mini-pool of function terms and four children equations are birthed similar to the way in which the initial population is generated above. The (K+1)st parent is used to produce a mutation by exchanging one of its terms with a random draw from the original pool of terms. An immigration child is also introduced by randomly drawing from the original pool of function terms, similar to the way in which an equation in the first generation of equations is formed. The mutation and immigration children, along with the other four children, are then executed on the input data and ranked along with the rest of the equations from the current generation. Next, the (K+1)*2 equations with the lowest rank are removed from the current generation of equations and the remaining equations are used to form the next generation of equations.

(9) Execute these new equations on the input data and choose the best fits using the fitness function at 4457. Another set of parents for the next generation are chosen using the weighted random draw as described above.

(10) Continue this process from generation to generation until the result of the fitness function is within user-defined constraints (e.g., until the result of the fitness function changes less than 0.1%), or until a predetermined number of generations has passed, for example, up to 200 generations may be used. The overall best scoring equation becomes the GRSM model at 4459 for the input data set. A GRSM model is determined for each anomaly under test.

The above process is also applied to an existing database of cancerous breast masses to develop the cancerous GRSM model. The process can be repeated using different data sets, where each data set represents a class to be discriminated from other classes. For example, a class may be a specific type of cancer (e.g., lobular or glandular) or a cyst. Once trained in this manner, using different data sets representing both cancerous and non-cancerous classes, the resulting GRSM models can then be used for discrimination of detected anomalies as cancerous or non-cancerous.

Figure 11:
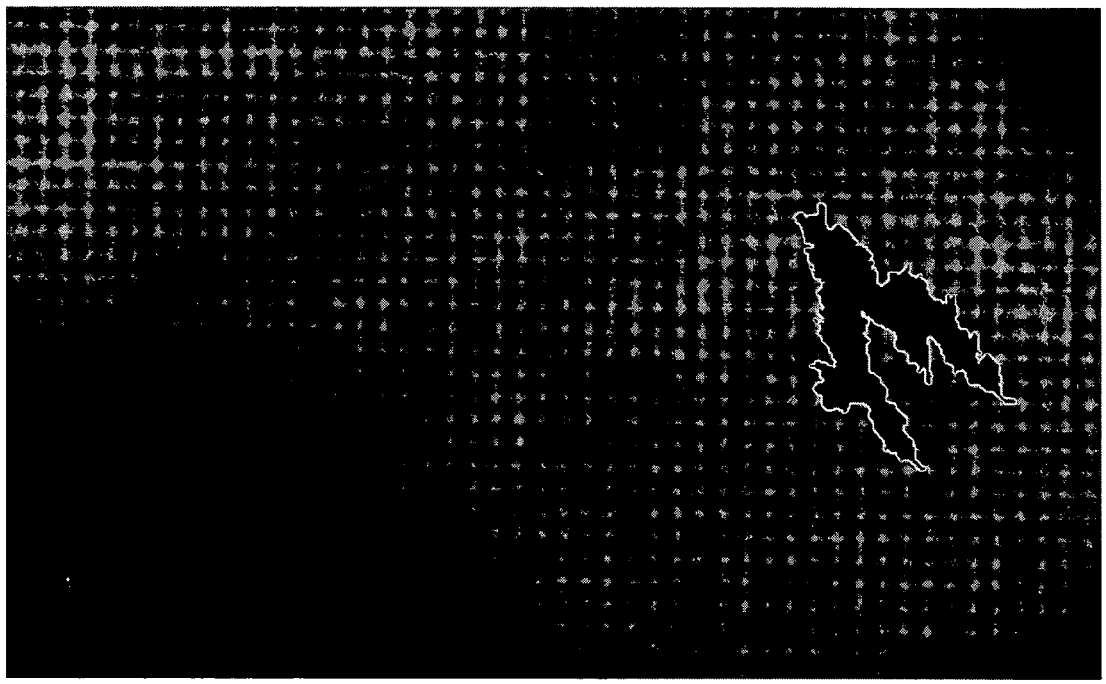
FIG. 11 shows a mammogram with a detected anomaly highlighted.
Figure 12:
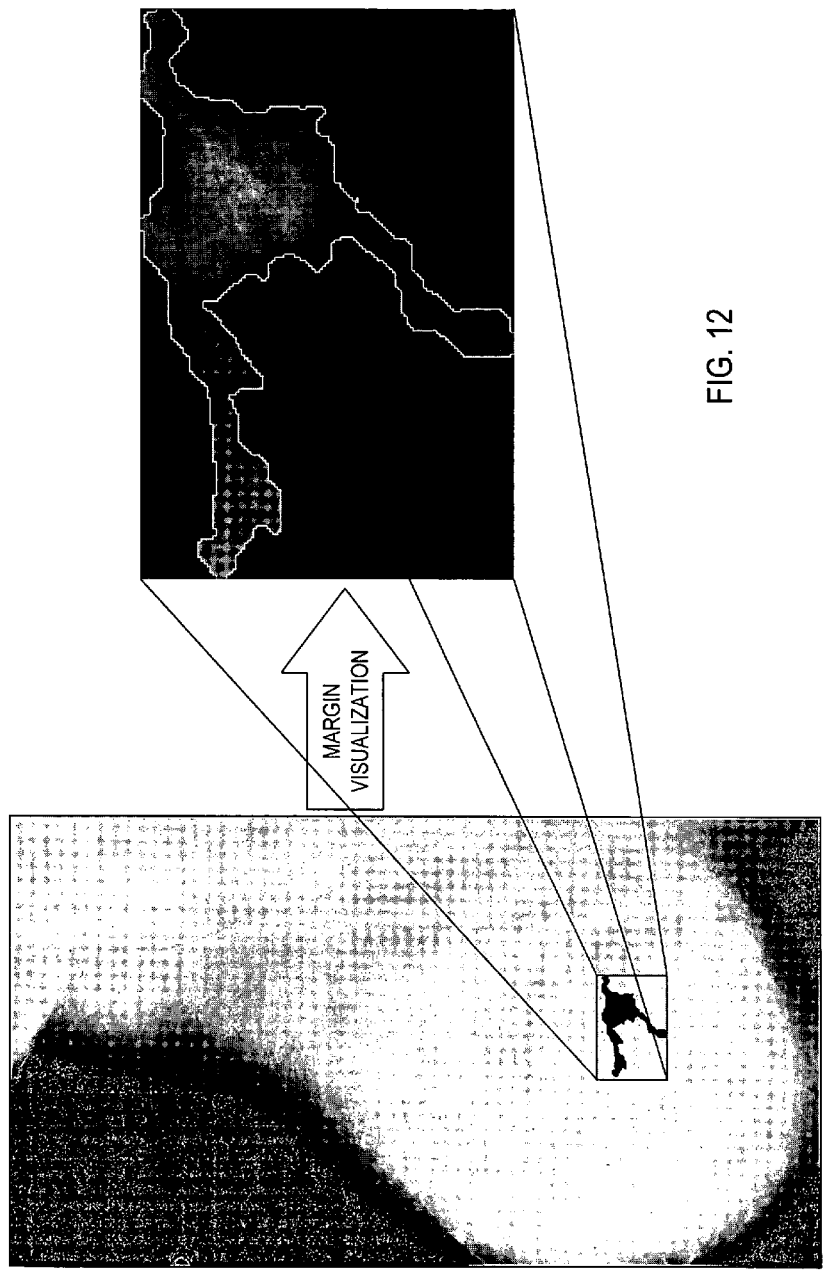
FIG. 12 shows a mammogram with the detected anomaly of FIG. 8A highlighted and enlarged to illustrate the margins of the detected anomaly.

The results of the anomaly detection and anomaly discrimination are displayed to the operator using a color overlay scheme as shown in FIG. 11. For example, a red anomaly could represent an anomaly that is probably cancerous, while a yellow anomaly could represent an anomaly that is probably non-cancerous. Other indicators may be used, such as rectangles drawn around the anomalies and arrows pointing to the anomalies. Also provided is the degree of confidence in the decision. This same display, when integrated with controls to interactively set the threshold and linking coefficient β parameters, can be used by the operator to visualize the margins of the anomalies (see FIG. 12). This visualization enables further expert discrimination by the radiologist by allowing the radiologist to better see the total extent of the cancerous material, and aids in better removal of the mass during surgery.

Figure 13:
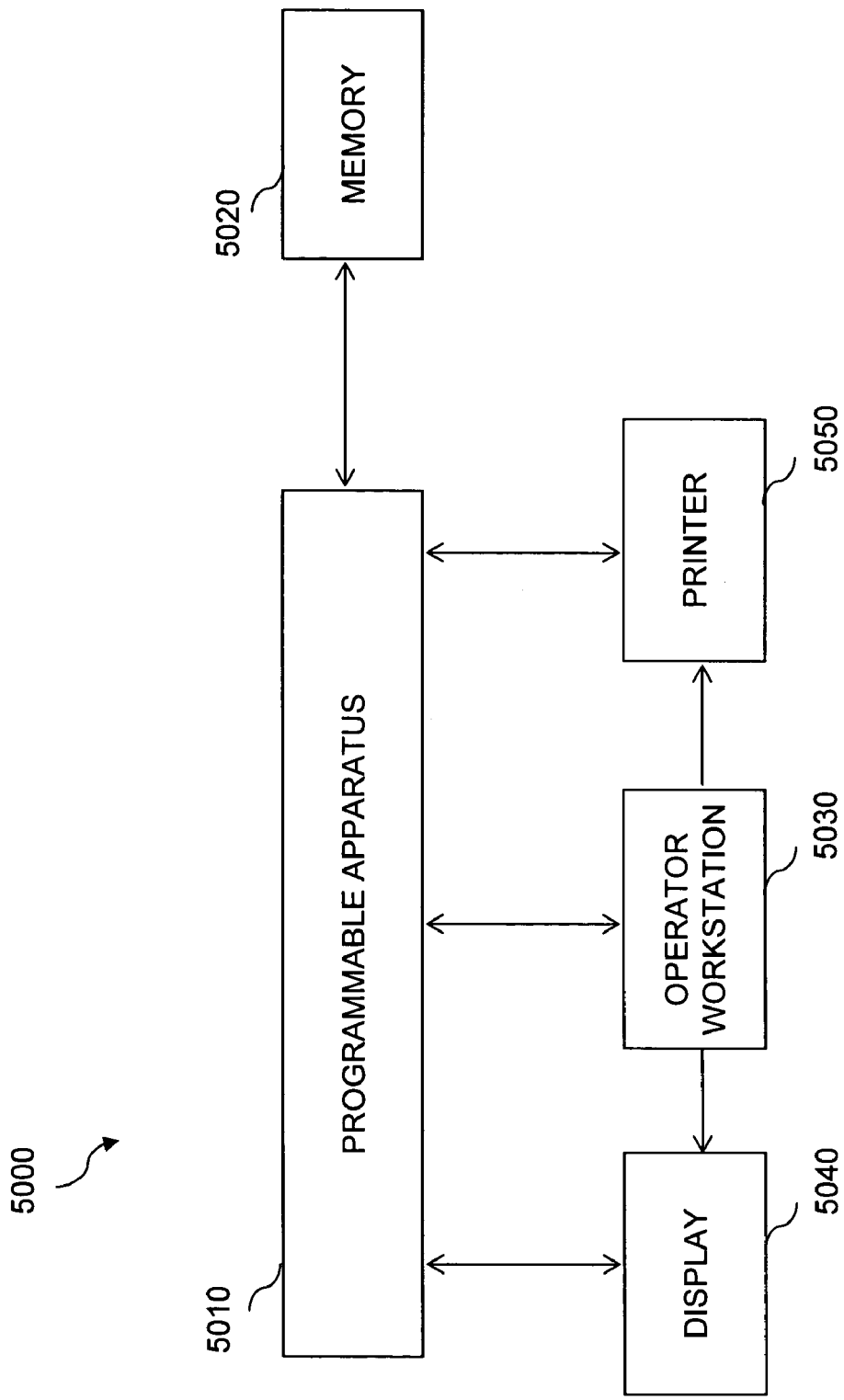
FIG. 13 illustrates a system for the processing of medical imagery.

FIG. 13 illustrates a system 5000 for processing medical image data in accordance with the present invention. The method of the present invention may be performed on a programmable apparatus 5010 having software capable of instructing the programmable apparatus 5010 to perform the invention. The programmable apparatus may be a computer (for example, a general-purpose computer, such as a desktop computer, or a CAD system) having an executable program, such as MATLAB® or C++, that enables the computer to perform the invention, and an operating system such as Windows®, Windows NT®, Linux®, UNIX®, etc. Preparation of the executable program to provide the above described method is within the capability of a skilled computer programmer. The executable program may reside on a computer-readable memory 5020, such as a computer disk drive, a CD-ROM, DAT tape, FLASH memory, EPROM, etc.

The image data may be transmitted to the programmable apparatus 5010 and to the memory 5020. The programmable apparatus 5010 may receive commands from an operator via an operator workstation 5030 typically having a keyboard and other input devices, such as a mouse. The operator may control the system 5000 using the input devices. A display 5040 coupled to the operator workstation 5030 may be used to view the image data. Additionally, the image may be printed using a printer 5050, which may be connected to the programmable apparatus 5010 and the operator workstation 5030. Other hardware and software elements may be used by those with ordinary skill in the art.

The present invention has been described with respect to the detection and discrimination of anomalous masses in mammogram images. However, the present invention may also be used in detecting other types of cancer (e.g., lung cancer, kidney cancer, bone cancer, etc.), and it may be used with other types of images (e.g., MRI and ultrasound imagery). It is further envisaged that the present invention may be used in other environments in which detection and discrimination of objects is required, such as pattern recognition and detection and discrimination of targets in clutter. For example, the ADA module may be used to detect targets in infrared imagery, and the GRSM module may be used to predict impact points for rockets and mortars to provide early warning for soldiers.

Thus, it will be appreciated by those skilled in the art that modifications and variations of the present invention are possible without departing from the principles and spirit of the invention, the scope of which is defined in the appended claims and their equivalents.

What is claimed is:

1. A method for discriminating anomalies in a medical image, comprising:
   detecting with a programmable computer anomalies in the medical image;
   classifying the detected anomalies as cancerous or noncancerous, said classifying comprising,
      determining a genetic response surface methodology (GRSM) model for each of the detected anomalies,
      determining a cancerous GRSM model from a database of cancerous anomalies, and
      comparing the cancerous GRSM model to the GRSM model for each of the detected anomalies to classify each of the detected anomalies as cancerous or noncancerous; and
   displaying the detected anomalies on the medical image.

2. The method of claim 1, wherein the medical image is a mammogram image, a magnetic resonance image (MRI), or an ultrasound image of breast tissue.

3. The method of claim 1, further comprising segmenting the medical image, before said detecting anomalies, to identify a region of interest, said segmenting the medical image comprising:
   downsampling the medical image;
   detecting structures in the downsampled medical image;
   calculating a centroid of energy of the downsampled medical image, the centroid of energy being within a largest one of the detected structures;
   identifying edges of the largest structure using the centroid of energy;
   defining a bounding box around the largest structure and cropping the medical image according to the bounding box; and
   rescaling the cropped image to a full-size image.

4. The method of claim 3, wherein said downsampling the medical image comprises replacing blocks of pixels of the medical image, each block of pixels being replaced with one pixel having an intensity equal to an average intensity of the block of pixels.

5. The method of claim 3, wherein the largest one of the detected structures is an image of breast tissue.

6. The method of claim 1, wherein said detecting anomalies in the medical image comprises:
   setting a current threshold value to an initial value of a maximum pixel intensity of the medical image plus 1;
   setting a minimum threshold value to a mean pixel intensity of the medical image;
   setting a linking coefficient value;
   thresholding the medical image, said thresholding ranging from the initial value of the current threshold value to the minimum threshold value; and
   forming clusters of anomalies for each pixel having an intensity greater than the minimum threshold value using the linking coefficient.

7. The method of claim 6, wherein said setting a linking coefficient value comprises:
   calculating a histogram of pixel intensities for the medical image;
   determining a maximum intensity value from the histogram;
   calculating slopes of the histogram in each direction away from the maximum intensity value and choosing a minimum one of the slopes; and
   calculating the linking coefficient value using the minimum slope.

8. The method of claim 6, wherein said forming clusters of anomalies comprises:
   linking each pixel having an intensity greater than the minimum threshold value (referred to as an originating pixel) to its nearest neighbor pixels;
   calculating a linked intensity for each nearest neighbor pixel according to the equation $I_L=(1+\beta*I)*I_N$, where $I_L$ is the linked intensity of the nearest neighbor pixel, $\beta$ is the linking coefficient, I is the intensity of the originating pixel, and $I_N$ is the intensity of the nearest neighbor pixel;
   if the originating pixel is associated with an existing anomaly, associating the nearest neighbor pixels having linked intensities greater than the minimum threshold value with the existing anomaly;

if the originating pixel is not associated with an existing anomaly and any of the nearest neighbor pixels is associated with an existing anomaly, associating the originating pixel with the existing anomaly; and if the originating pixel and none of the nearest neighbor pixels is associated with an existing anomaly, forming a new anomaly.

9. The method of claim 6, further comprising controlling the current threshold value and the linking coefficient value to define margins of the detected anomalies classified as cancerous.

10. The method of claim 1, further comprising defining margins of the detected anomalies classified as cancerous before said displaying the detected anomalies.

11. The method of claim 1, wherein said classifying the detected anomalies comprises, for each of the detected anomalies:

providing input data on a shape of the detected anomaly; and determining the GRSM model for the detected anomaly using the input data.

12. The method of claim 11, wherein said providing input data on a shape of the detected anomaly comprises:

calculating a centroid of energy of the detected anomaly;

calculating radii from the centroid of energy to an edge of the detected anomaly in predetermined angular increments;

calculating differences in successive radii;

calculating histograms for the radii and for the differences in successive radii;

normalizing an intensity profile for each radii; and returning the histograms and the normalized intensity profile as the input data.

13. The method of claim 1, wherein said determining a GRSM model for the detected anomaly comprises:

determining a termination condition;

identifying parameters to which the GRSM model for the detected anomaly is sensitive;

defining an initial pool of function terms using the parameters;

randomly creating an initial population of equations using random selections of the function terms;

determining a fitness function according to the input data and the parameters;

ranking each equation according to its fit to the fitness function;

determining whether the termination condition has been met;

generating, if the termination condition has not been met, a succeeding population of equations using a genetic algorithm, and repeating said ranking each equation, said determining whether the termination condition has been met, and said generating a succeeding population of equations until the termination condition has been met; and returning the equation having the highest rank as the GRSM model for the detected anomaly when the termination condition has been met.

14. The method of claim 13, wherein said generating a succeeding population of equations comprises producing children of a predetermined number of the equations having the highest ranks by randomly exchanging function terms between the equations having the highest ranks.

15. The method of claim 13, wherein said generating a succeeding population of equations comprises:

performing a weighted random draw from a current population of equations to choose K+1 parents, where K is an even number;

dividing K of the parents into pairs, forming a new pool of function terms for each pair using each pair's function terms, and generating a new set of children equations A using random combinations of the function terms from the new pool of function terms;

producing a mutation child equation B using the (K+1)st parent by exchanging one of the function terms of the (K+1)st parent with a random one of the function terms from the initial pool of function terms;

producing an immigration child equation C by randomly selecting function terms from the initial pool of function terms;

applying the fitness function to the children equations A, B, and C and ranking the children equations A, B, and C along with the equations in the current population of equations; and removing (K+1)*2 equations having the lowest ranks from the current population of equations and the children equations A, B, and C to form the succeeding population of equations.

16. The method of claim 1, wherein said displaying the detected anomalies on the medical image comprises displaying the detected anomalies on a visual representation of the medical image with indicia appearing therein indicating the locations of the detected anomalies.

17. A computer-readable storage in the form of a hard drive or disk or ROM or flash memory for storing computer instructions for computerized detection and classification of anomalies in a digitized medical image, the computer instructions comprising a process of:

segmenting the medical image to identify a region of interest;

detecting anomalies in the segmented medical image;

classifying the detected anomalies as cancerous or non-cancerous, said classifying comprising, determining a genetic response surface methodology (GRSM) model for each of the detected anomalies, determining a cancerous GRSM model from a database of cancerous anomalies, and comparing the cancerous GRSM model to the GRSM model for each of the detected anomalies to classify each of the detected anomalies as cancerous or non-cancerous; and displaying the detected anomalies on the medical image.

18. The computer-readable storage of claim 17, wherein the medical image is a mammogram image, a magnetic resonance image (MRI), or an ultrasound image of breast tissue.

19. The computer-readable storage of claim 17, wherein said segmenting the medical image comprises:

downsampling the medical image;

detecting structures in the downsampled medical image;

calculating a centroid of energy of the downsampled medical image, the centroid of energy being within a largest one of the detected structures;

identifying edges of the largest structure using the centroid of energy;

defining a bounding box around the largest structure and cropping the medical image according to the bounding box; and rescaling the cropped image to a full-size image.

20. The computer-readable storage of claim 19, wherein said downsampling the medical image comprises replacing blocks of pixels of the medical image, each block of pixels being replaced with one pixel having an intensity equal to an average intensity of the block of pixels.

21. The computer-readable storage of claim 19, wherein the largest one of the detected structures is an image of breast tissue.

22. The computer-readable storage of claim 17, wherein said detecting anomalies in the segmented medical image comprises:
   setting a current threshold value to an initial value of a maximum pixel intensity of the medical image plus 1;
   setting a minimum threshold value to a mean pixel intensity of the medical image;
   setting a linking coefficient value;
   thresholding the medical image, said thresholding ranging from the initial value of the current threshold value to the minimum threshold value; and
   forming clusters of anomalies for each pixel having an intensity greater than the minimum threshold value using the linking coefficient.

23. The computer-readable storage of claim 22, wherein said setting a linking coefficient value comprises:
   calculating a histogram of pixel intensities for the region of interest;
   determining a maximum intensity value from the histogram;
   calculating slopes of the histogram in each direction away from the maximum intensity value and choosing a minimum one of the slopes; and
   calculating the linking coefficient value using the minimum slope.

24. The computer-readable storage of claim 22, wherein said forming clusters of anomalies comprises:
   linking each pixel having an intensity greater than the minimum threshold value (referred to as an originating pixel) to its nearest neighbor pixels;
   calculating a linked intensity for each nearest neighbor pixel according to the equation $I_L=(1+\beta*I)*I_N$, where $I_L$ is the linked intensity of the nearest neighbor pixel, $\beta$ is the linking coefficient, I is the intensity of the originating pixel, and $I_N$ is the intensity of the nearest neighbor pixel;
   if the originating pixel is associated with an existing anomaly, associating the nearest neighbor pixels having linked intensities greater than the minimum threshold value with the existing anomaly;
   if the originating pixel is not associated with an existing anomaly and any of the nearest neighbor pixels is associated with an existing anomaly, associating the originating pixel with the existing anomaly; and
   if the originating pixel and none of the nearest neighbor pixels is associated with an existing anomaly, forming a new anomaly.

25. The computer-readable storage of claim 22, further comprising controlling the current threshold value and the linking coefficient value to define margins of the detected anomalies classified as cancerous.

26. The computer-readable storage of claim 17, further comprising defining margins of the detected anomalies classified as cancerous before said displaying the detected anomalies.

27. The computer-readable storage of claim 17, wherein said classifying the detected anomalies comprises, for each of the detected anomalies:
   providing input data on a shape of the detected anomaly; and
   determining the GRSM model for the detected anomaly using the input data.

28. The computer-readable storage of claim 27, wherein said providing input data on a shape of the detected anomaly comprises:
   calculating a centroid of energy of the detected anomaly;
   calculating radii from the centroid of energy to an edge of the detected anomaly in predetermined angular increments;
   calculating differences in successive radii;
   calculating histograms for the radii and for the differences in successive radii;
   normalizing an intensity profile for each radii; and
   returning the histograms and the normalized intensity profile as the input data.

29. The computer-readable storage of claim 28, wherein said determining a GRSM model for the detected anomaly comprises:
   determining a termination condition;
   identifying parameters to which the GRSM model for the detected anomaly is sensitive;
   defining an initial pool of function terms using the parameters;
   randomly creating an initial population of equations using random selections of the function terms;
   determining a fitness function according to the input data and the parameters;
   ranking each equation according to its fit to the fitness function;
   determining whether the termination condition has been met;
   generating, if the termination condition has not been met, a succeeding population of equations using a genetic algorithm, and repeating said ranking each equation, said determining whether the termination condition has been met, and said generating a succeeding population of equations until the termination condition has been met; and
   returning the equation having the highest rank as the GRSM model for the detected anomaly when the termination condition has been met.

30. The computer-readable storage of claim 29, wherein said generating a succeeding population of equations comprises producing children of a predetermined number of the equations having the highest ranks by randomly exchanging function terms between the equations having the highest ranks.

31. The computer-readable storage of claim 29, wherein said generating a succeeding population of equations comprises:
   performing a weighted random draw from a current population of equations to choose K+1 parents, where K is an even number;
   dividing K of the parents into pairs, forming a new pool of function terms for each pair using each pair's function terms, and generating a new set of children equations A using random combinations of the function terms from the new pool of function terms;
   producing a mutation child equation B using the (K+1)st parent by exchanging one of the function terms of the (K+1)st parent with a random one of the function terms from the initial pool of function terms;
   producing an immigration child equation C by randomly selecting function terms from the initial pool of function terms;
   applying the fitness function to the children equations A, B, and C and ranking the children equations A, B, and C along with the equations in the current population of equations; and removing (K+1)*2 equations having the lowest ranks from the current population of equations and the children equations A, B, and C to form the succeeding population of equations.

32. The computer-readable storage of claim 29 wherein the parameters comprise a plurality of slopes calculated from the histograms for the radii and the differences in successive radii.

33. The computer-readable storage of claim 17, wherein said displaying the detected anomalies on the medical image comprises displaying the detected anomalies on a visual representation of the medical image with indicia appearing therein indicating the locations of the detected anomalies.

34. A system for analyzing a medical image to detect and classify anomalies in the medical image, comprising:
   a programmable computer; and
   computer software installed on the programmable computer, the computer software enabling the programmable computer to,
      detect anomalies in the medical image,
      determine a genetic response surface methodology (GRSM) model for each of the detected anomalies,
      determine a cancerous GRSM model from a database of cancerous anomalies,
      compare the cancerous GRSM model to the GRSM model for each of the detected anomalies to classify each of the detected anomalies as cancerous or non-cancerous, and
      display the detected anomalies on the medical image.

35. An apparatus for automatically detecting and classifying anomalies in a medical image, comprising:
   means for detecting anomalies in the medical image;
   means for determining a genetic response surface methodology (GRSM) model for each of the detected anomalies;
   means for determining a cancerous GRSM model from a database of cancerous anomalies;
   means for comparing the cancerous GRSM model to the GRSM model for each of the detected anomalies to classify each of the detected anomalies as cancerous or non-cancerous; and
   means for displaying the detected anomalies on the medical image.

36. A system for detecting and classifying anomalies in a medical image, comprising:
   a detector detecting anomalies in the medical image;
   a classifier determining a genetic response surface methodology (GRSM) model for each of the detected anomalies, determining a cancerous GRSM model from a database of cancerous anomalies, and comparing the cancerous GRSM model to the GRSM model for each of the detected anomalies to classify each of the detected anomalies as cancerous or non-cancerous; and
   a display to display the detected anomalies on the medical image.

* * * * *